United States Patent
Milner

[11] 3,806,162
[45] Apr. 23, 1974

[54] TOWING BAR

[76] Inventor: William J. Milner, Pleasantville, Iowa 50225

[22] Filed: Oct. 12, 1972

[21] Appl. No.: 296,973

[52] U.S. Cl. .............................. 280/502, 280/491 R
[51] Int. Cl. .............................................. B60d 1/14
[58] Field of Search ............ 280/502, 491 R, 491 E

[56] References Cited
UNITED STATES PATENTS

| | | | |
|---|---|---|---|
| 3,083,040 | 3/1963 | Hayman | 280/493 |
| 2,139,970 | 12/1938 | Moore | 280/502 X |
| 3,119,631 | 1/1964 | Wanamaker | 280/502 X |
| 3,649,049 | 3/1972 | Woodke | 280/502 |
| 3,072,419 | 1/1963 | Safford | 280/502 X |
| 3,472,529 | 10/1969 | Gal | 280/502 |

*Primary Examiner*—Leo Friaglia
*Attorney, Agent, or Firm*—Zarley, McKee & Thomte

[57] ABSTRACT

A towing bar comprising first and second brackets detachably secured to the bumper of the towed vehicle. Each of the brackets has a shaft mounted thereon which is rotatable about a vertical axis. A tow bar member is pivotally secured about a horizontal axis to each of the shafts and extends forwardly and inwardly therefrom. A chain and chain tightening means is provided on each of the brackets for connection to the towed vehicle frame so that a large portion of the forces imposed on the bracket will be transmitted to the frame rather than the bumper. A pivotal linkage means is provided at the forward ends of the tow bar members to permit the tow bar members to be selectively pivoted with respect to each other. Means is also provided on the linkage means for selectively preventing the relative pivotal movement between the tow bar members. A coupling means is secured to the linkage means for detachable connection to the towing vehicle.

9 Claims, 4 Drawing Figures

PATENTED APR 23 1974 3,806,162
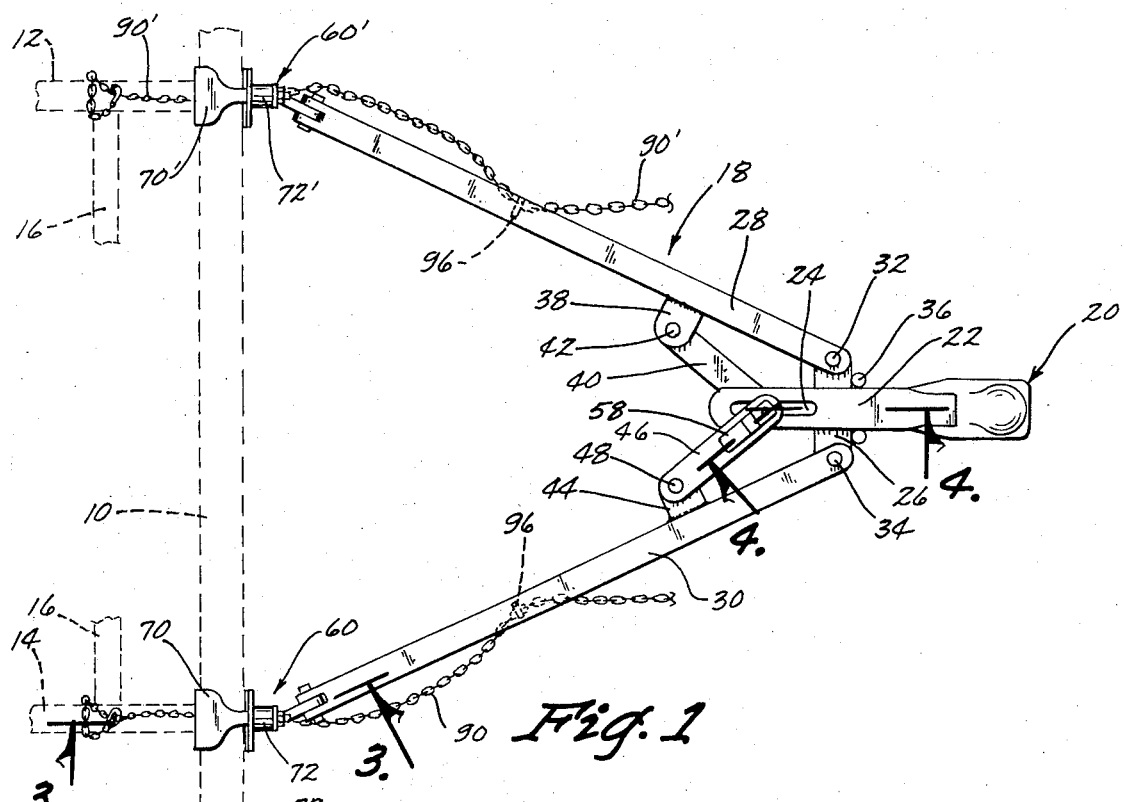
Fig. 1
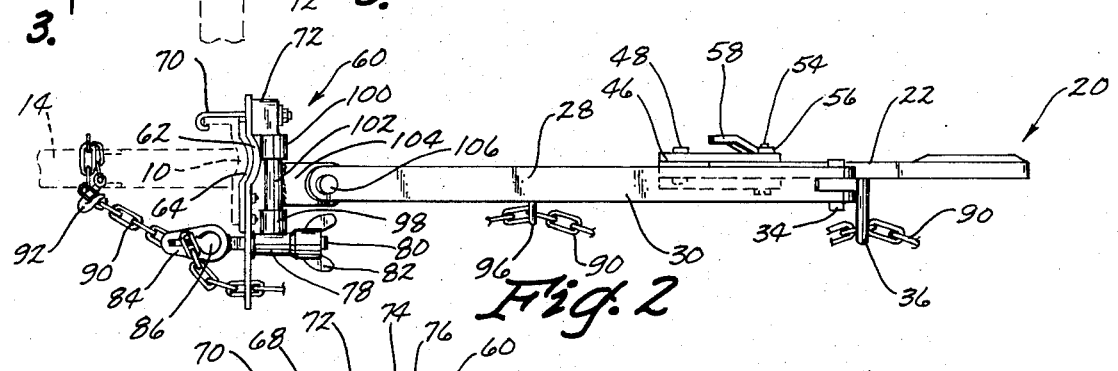
Fig. 2
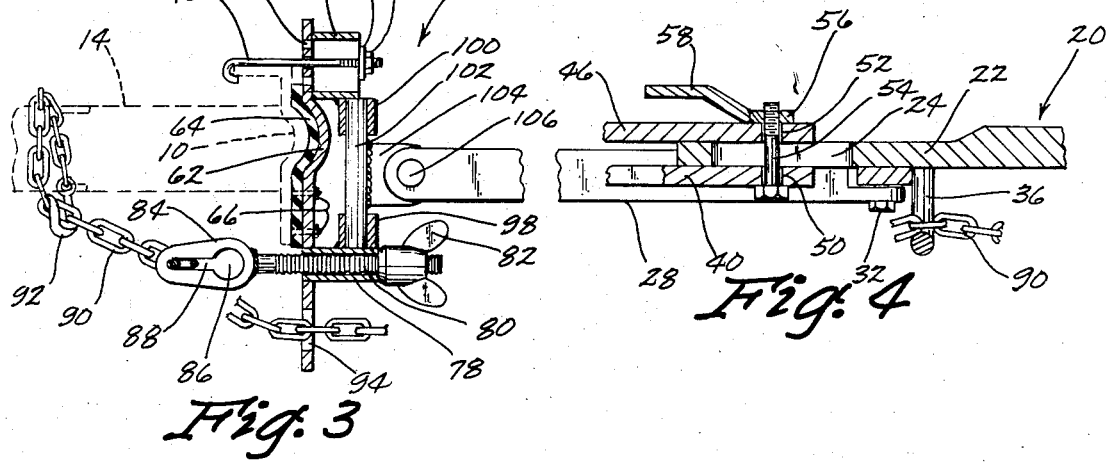
Fig. 3
Fig. 4

TOWING BAR

Many towing bars have been previously provided to permit one vehicle to be towed behind another vehicle. Conventional towing bars ordinarily are secured to the bumper of the towed vehicle and extend forwardly therefrom for connection to the rear bumper of the towing vehicle. The front bumper of the towed vehicle is frequently damaged since the conventional towing bars impose great stress forces on the front bumper at the point of connection thereto. Further, the conventional towing bars do not have any convenient adjustment means so that the towing bar can be used on various vehicles.

Therefore, it is a principal object of this invention to provide an improved towing bar.

A further object of this invention is to provide a towing bar which prevents damage to the bumper of the towed vehicle.

A further object of this invention is to provide a towing bar including means for transmitting the stress forces from the bumper of the towed vehicle to the frame thereof.

A further object of this invention is to provide a towing bar which may be used on various vehicles.

A further object of this invention is to provide a towing bar which may be quickly attached to the towed vehicle.

A still further object of this invention is to provide a towing bar which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top view of the towing bar:

FIG. 2 is a side view of the towing bar:

FIG. 3 is a sectional view as seen along lines 3—3 of FIG. 1; and

FIG. 4 is a sectional view seen along lines 4—4 of FIG. 1.

Referring to the drawings, the numeral 10 refers generally to the bumper of the towed vehicle. Bumper 10 is secured to the frame member 12 and 14 of the towed vehicle while the numeral 16 refers to a cross member extending between the frame members 12 and 14 adjacent to the forward end thereof. The numeral 18 refers generally to the towing bar of this invention.

Towing bar 18 is provided with a coupling means 20 at its forward end which is adapted to be detachably secured to the hitch ball provided on the rearward end of the towing vehicle. Bar 22 extends rearwardly from the coupling means 20 and has a longitudinal slot 24 formed therein. Plate 26 is secured to the bar 22 by welding or the like as illustrated in FIG. 1 and has the forward ends of towing bar members 28 and 30 pivotally secured to the opposite ends thereof by pins 32 and 34 respectively. A U-shaped yoke 36 extends downwardly from the bar 22 as illustrated in FIGS. 1, 2 and 4.

Ear 38 is welded to bar member 28 and has a link 40 pivoted thereto at 42. Ear 44 is welded to bar member 30 and has link 46 pivotally secured thereto at 48. Links 40 and 46 have registering bolt openings 50 and 52 formed therein respectively adapted to receive a bolt 54 extending therethrough and through the slot 24. A nut 56 is threadably mounted on the bolt 54 and has a handle 58 welded thereto and extending upwardly therefrom. The links 40 and 46 and hence the bar members 28 and 30 may be selectively locked in various positions by simply tightening the nut 56 which draws the links 46 and 40 tightly against the upper and lower surfaces of the bar 22.

The numeral 60 refers generally to a bracket which is secured to the rearward end of the bar member 30 while the numeral 60' refers generally to the bracket which is secured to the rearward end bar member 28. Inasmuch as the bracket 60 and 60' are identical, only bracket 60 will be described in detail "'" indicating identical structure on the bracket 60'.

Bracket 60 comprises a base portion 62 which is generally complimentary in shape to the front surface of the bumper 10 and which has a rubber backing material 64 secured thereto by bolt 66 which is positioned between the base portion 62 and the bumper 10 to protect the bumper 10. The upper end of base portion 62 is provided with a plurality of vertically spaced apart openings 68 formed therein adapted to received a J-shaped bolt 70. Collar 72 is welded to the upper end of base portion 62 as illustrated in FIG. 3. The bolt 70 is provided with a washer 74 and nut 76 for securing the upper end of the bracket to the upper end of the bumper 10 as illustrated in FIG. 3.

Sleeve 78 is welded to the base portion 62 and extends forwardly therefrom as shown in FIG. 3. Sleeve 78 is adapted to receive the bolt 80 extending therethrough which has a wing nut 82 threadably mounted on the forward end thereof. The rearward end of bolt 80 is provided with a head portion 84 having an opening 86 formed therein which communicates with an elongated slot 88 extending rearwardly therefrom which is adapted to receive an individual link of a chain 90. Chain 90 is provided with a hook element 92 at one end thereof to permit the chain 90 to be extended around the frame 14 as shown in FIG. 3. Chain 90 extends through the opening 94 formed in the lower end of the base portions 62 and extends through eye 96 extending downwardly from the bar member 30. The chain 90 also extends through the yoke 36 and would be secured at its forward end to the frame of the towing vehicle so as to serve as a safety chain.

Collar 98 is welded to sleeve 76 and extends upwardly therefrom. Collar 100 is welded to collar 72 and extends downwardly therefrom for rotatably receiving the upper end of a shaft 102. Shaft 102 is rotatably mounted at its lower end in the collar 98. Ear 104 is welded to the shaft 102 and extends forwardly therefrom for pivotal connection to the rearward end of the bar member 30 by means of the horizontally disposed pin 106. Thus, the rotatable shaft 102 and the rotatable pin 106 provides a universal joint connected between the bracket 60 and the bar member 30.

Assuming that the towing bar is initially in a stored condition, the normal method of operation is as follows. The handle 58 is loosened to permit the bar members 28 and 30 to be pivotally moved with respect to each other so that the bracket 60 and 60' are in a spaced apart relationship corresponding to the distance between the frame members 12 and 14. The bracket 60 and 60' are secured to the bumper 10 as previously described with the bolt 70 and 70' being tightened. The chain 90 is then extended around the frame member 14 as illustrated in FIGS. 2 and 3 with the hook element 92 being slipped over an individual link of the chain 90 as illustrated in the drawings. The chain 90 is then slipped through the head portion 84 as also illustrated in FIGS. 2 and 3. The wing nut 82 is then tightened which draws the head portion 84 towards the bumper to place the chain 90 under tension to securely anchor the bracket 60 to the bumper. The chain 90 is then extended through the opening 94, eye 96, yoke 36 and secured to the towing vehicle frame to serve as a safety chain. Likewise, the bracket 60' and chain 90' is also secured to the bumper 10 and the frame member 12. The handle 58 is then again tightened to prevent relative pivotal movement between the various components at the forward end of the towing bar 18.

The coupling means 20 is then secured to the hitch ball of the towing vehicle and the towing operation begun. The bumper of the vehicle being towed is protected from damage by the fact that the chains 90 and 90' extend around the frame members to transfer the forces imposed thereon to the frame members rather than the bumper itself. The bumper 10 is also prevented from being damaged by the universal joint arrangement created by the shaft 102 rotating in the collars 100 and 98 and due to the pivotal relationship of the bar member 30 and the rotatable pin 106.

Thus it can be seen that a novel towing bar has been provided which permits the towed vehicle to be easily towed and which prevents damage to the bumper of the towed vehicle. Therefore it can be seen that the invention accomplishes at least all of its stated objectives.

I claim:

1. A towing bar for permitting a towing vehicle to tow a towed vehicle, comprising,
    first and second spaced apart brackets detachably secured to the front bumper of the towed vehicle,
    first and second tow bar members pivotally secured to said first and second brackets and extending forwardly and inwardly therefrom,
    a coupling means connected to the forward end of said tow bar members for connection to the towing vehicle,
    means on said brackets to transmit the towing forces to the towed vehicle frame.

2. The towing bar of claim 1 wherein said means on said brackets comprises a chain member operatively secured to each of said brackets which is detachably secured to the frame of the towed vehicle, and a chain tightening means mounted on each of said brackets for increasing the tension in said chain member so that said chain member provides a rigid connection between said bracket and the frame.

3. The towing bar of claim 2 wherein each of said chain elements also extends frowardly towards the towing vehicle for connection therewith to serve as a safety chain means.

4. The towing bar of claim 2 wherein said coupling means comprises a forwardly extending bar means having a socket coupler at its forward end, the forward ends of said tow bar members being pivotally secured to said bar means, and means for selectively limiting the pivotal movement between said tow bar members and said bar means.

5. The towing bar of claim 4 wherein said means for selectively limiting said pivotal movement comprises a first link member pivotally secured at one end to said first tow bar member and pivotally secured at its other end to said bar means, a second link member pivotally secured at one end to said second tow bar member and pivotally secured at its other end to said bar means, and means for drawing said other ends of said link members into frictional engagement with said bar means.

6. The towing bar of claim 5 wherein said bar means has a longitudinally extending slot formed therein, a bolt means extending through said other end of said first link member, said slot and said other end of said second link member.

7. The towing bar of claim 6 wherein a handle-nut means is threadably secured to said bolt means for drawing said link members and said bar means into frictional engagement with each other.

8. The towing bar of claim 2 wherein said brackets are secured to said tow bar members by a universal joint means.

9. The towing bar of claim 8 wherein said means on said brackets comprises a vertically disposed shaft operatively rotatably secured to each of said brackets, each of said tow bar members being pivotally secured about a horizontal axis to said vertically disposed shafts to provide a universal joint connection between said tow bar members and said brackets.

* * * * *